United States Patent [19]
Kirner

[11] 4,250,505
[45] Feb. 10, 1981

[54] INDEPENDENT LANDING MONITOR

[75] Inventor: Ernest O. Kirner, Coral Springs, Fla.

[73] Assignee: The Bendix Corporation, Southfield, Mich.

[21] Appl. No.: 101,309

[22] Filed: Dec. 7, 1979

[51] Int. Cl.³ .............................................. G01S 13/00
[52] U.S. Cl. .............................. 343/5 LS; 343/6 DF; 343/12 A
[58] Field of Search .............. 343/5 GC, 5 LS, 6 DF, 343/12 A

[56] References Cited

U.S. PATENT DOCUMENTS

| | | | |
|---|---|---|---|
| 2,536,496 | 1/1951 | Falloon | 343/5 LS X |
| 2,604,621 | 7/1952 | Earp et al. | 343/5 LS X |
| 3,765,019 | 10/1973 | Kosowsky | 343/5 LS |
| 3,875,551 | 4/1975 | Young | 343/5 LS |

Primary Examiner—Malcolm F. Hubler
Attorney, Agent, or Firm—B. L. Lamb; W. G. Christoforo

[57] ABSTRACT

This invention comprises means for monitoring the operation of an aircraft landing guidance system which functions independently of the landing guidance system. The means include a radio altimeter aboard the aircraft, a reflector positioned on the ground at a predetermined location along the prescribed approach path to provide enhanced return of the altimeter signal and means for comparing the actual radio altitude with a predetermined altitude value to provide an indication of the location of the aircraft within a tolerable distance from a prescribed point on the approach path.

4 Claims, 4 Drawing Figures

INDEPENDENT LANDING MONITOR

The present invention relates to a landing monitor for an aircraft. More particularly, it relates to apparatus for confirming on-course operation of an aircraft during restricted visibility landings, which apparatus does not involve active ground-based equipment nor the airborne equipment used for primary guidance.

There are several systems now in use to provide approach and landing guidance to aircraft under conditions of restricted or zero visibility. Among these are the fixed beam Instrument Landing System (ILS), Precision Approach Radar (PAR) and scanning beam Microwave Landing System (MLS). Accurate guidance in all of the systems is dependent upon the integrity of either or both the airborne or the ground based components of the system. For example, ILS uses two ground based transmitters to generate a localizer beam and a glide slope beam and the aircraft uses two receivers to derive guidance signals from the beams for steering the aircraft along the proper course and glide slope for landing. Failure could occur in any one of these components in such a way that the aircraft pilot, unaware of the fault, might proceed into disaster. Certainly, such a possibility has not been overlooked in the design of both airborne and ground based ILS equipment. The answer has been to include in the equipment monitoring and self-test features intended to give prompt warning of system failures. Notwithstanding such precautions, pilots have expressed a strongly felt desire for a monitoring device to confirm on-course, on-glide path operation of some critical point in the landing approach and to inspire the greatest degree of confidence in the primary guidance system, such a device must operate entirely independently of the primary system.

The function of an independent monitor is fulfilled to a minor extent by the marker beacons included as standard elements in the ILS. When an aircraft crosses a marker beacon on an approach to landing, the approximate distance to the runway threshold is known and at that known distance the altitude of an aircraft on the proper glide slope is also known. Thus a pilot can confirm, with a modicum of confidence, proper operation of the ILS and the accuracy of his pilotage, by observing his altitude at the time of crossing the marker beacon.

The marker beacon is less than satisfactory as an independent landing monitor, however, because the broad beam of the beacon does not provide a sufficiently precise position fix for a traversing aircraft. A recently developed landing monitor operating independently of the ILS shows primise of locating the aircraft during a landing approach with sufficient accuracy to confirm that the aircraft is on proper course and glide slope at a critical point in the let down. This monitor comprises several antennas appropriately located with respect to the runway threshold and centerline for receiving signals from the radio altimeter, with which most commercial aircraft are now equipped. The received signals are processed interferometrically to obtain the bearing angles of the aircraft, from which the aircraft position is readily computed. The ground derived information, either bearing angles or position, is relayed to the approaching aircraft by a data up-link for display to the pilot.

It is an object of the present invention to provide a landing monitor which operates independently of the ILS or other landing guidance system to confirm that the aircraft is positioned within a tolerable distance from a critical point on the prescribed approach course.

It is a further object of the invention to provide such a monitor making use of a radio altimeter but which is simpler and considerably less costly both for ground installations and airborne equipment than prior radio altimeter dependent monitors.

It is another object of the invention to provide an independent landing monitor which will signal the aircraft pilot unambiguously whether the landing may be safely completed or whether a missed approach should be executed.

BRIEF DESCRIPTION

Briefly, the present invention comprises positioning on the ground at one or more strategic locations along the approach path either passive or semi-active reflectors which are responsive to illumination by the radio altimeter transmitter of an approaching aircraft. The reflectors are designed to reflect a comparatively narrow beam with substantial gain so that an overflying aircraft which is within a well defined area located vertically above the reflector will receive a signal enhanced in strength over the normal return. The altimeter return signal is threshold detected thereby establishing the time of location of the aircraft within the reflected beam. At this time, the altitude of the aircraft measured by the radio altimeter is compared with the altitude predetermined as the altitude at which the glide slope beam intersects the reflector beam. If the actual altitude is equal to the predetermined altitude, within tolerances, the proper location of the aircraft at a critical point in the descent to landing is established and a signal is given to the pilot to complete the landing. Otherwise, a signal is given to the pilot to execute a missed approach.

DETAILED DESCRIPTION

Figure 1:
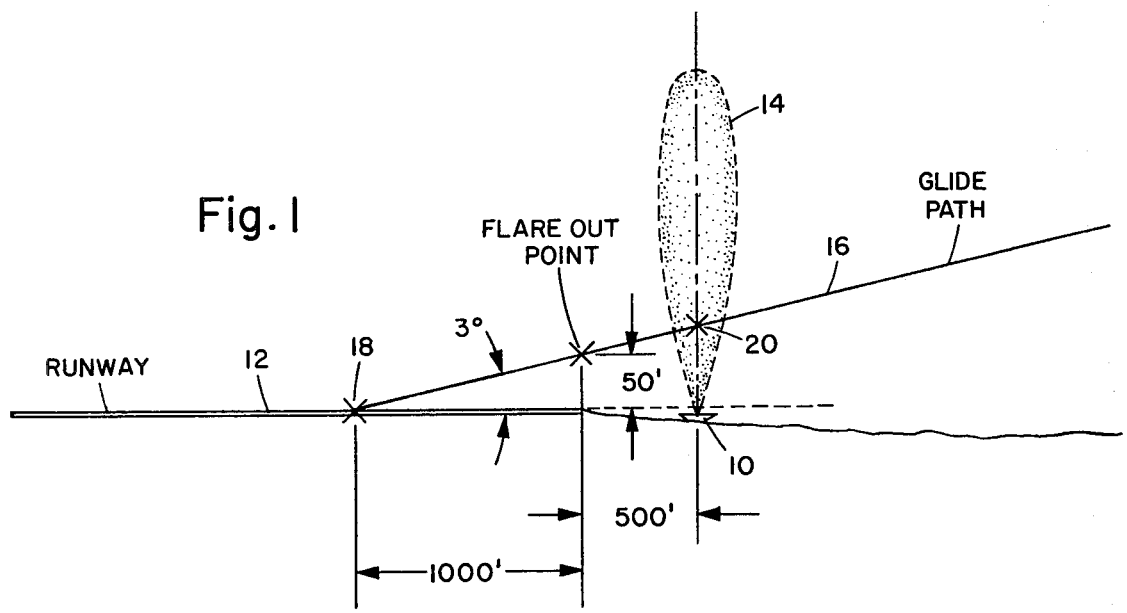
FIG. 1 is an elevation of one example of an airport installation of the ground based portion of the invention.

FIG. 1 illustrates a suitable ground installation to enable monitoring of Category III, zero visibility, landings in accordance with the present invention. A parabolic reflector 10 is positioned with its axis directed vertically upward at a site located on the extension of the centerline of the runway 12 at a distance of 500 feet from the runway threshold. If an approaching aircraft is on a course tolerably aligned with the runway centerline, the energy beam transmitted by the radio altimeter of the aircraft will illuminate the reflector 10 and a narrow vertical beam 14 will be reflected therefrom which will be detected by the receiver of the radio altimeter as a signal of enhanced strength.

The glide slope transmitter of the ILS, located some distance down the runway from the threshold, projects a beam 16 which is narrow in elevation and broad in azimuth coverages. The glide slope beam appears to intersect the runway at an angle of 3 degrees at a point 18, 1000 feet down the runway from the threshold. With this geometry the axis of the glide slope beam intersects the axis of the reflector beam at a point 20 approximately 75 feet above the level of the runway. There is no interaction between the glide slope and reflector beams, and certainly none is desired, because of the wide separation of the carrier frequencies of the beams. As will later be described, proper operation of the aircraft and the landing guidance system is monitored by comparing the altitude measured by the radio altimeter at the time of reception of the signal from the reflected beam with the known altitude of the intersection point 20 of the glide slope and reflector beams. The approach "window" thereby created, through which the aircraft must pass for a safe landing, is an area surrounding point 20 bounded vertically by an allowable tolerance in altitude and horizontally by an allowable distance off course of the aircraft with respect to point 20.

Analogously to the classic radar equation, the power received, $P_R$, by a radio altimeter with a transmitter power output of $P_T$ and antenna gain of $G_1$ is theoretically given by the expression $$P_R = \frac{P_T G_1 \lambda^2 \sigma_1}{16\pi^2 H^2} \quad \text{(Equation 1)}$$

where $\lambda$ is the transmitter wavelength;

$\sigma_1$ is the reflectivity of the ground, typically 0 to $-20$ dB; and

H is the altitude.

If a reflector of gain $G_2$ is centered in the altimeter beam, the received power $\Delta P_R$ is, theoretically, $$\Delta P_R = \frac{P_T G_1^2 G_2^2 \lambda^4 \sigma_2}{64\pi^4 H^4} \quad \text{(Equation 2)}$$

where $\sigma_2$ is the reflectivity of the reflector, typically 0 dB.

The increase in the received signal power when overflying a reflector is given by the ratio of $$\frac{\Delta P_R}{P_R}$$

Figure 2:
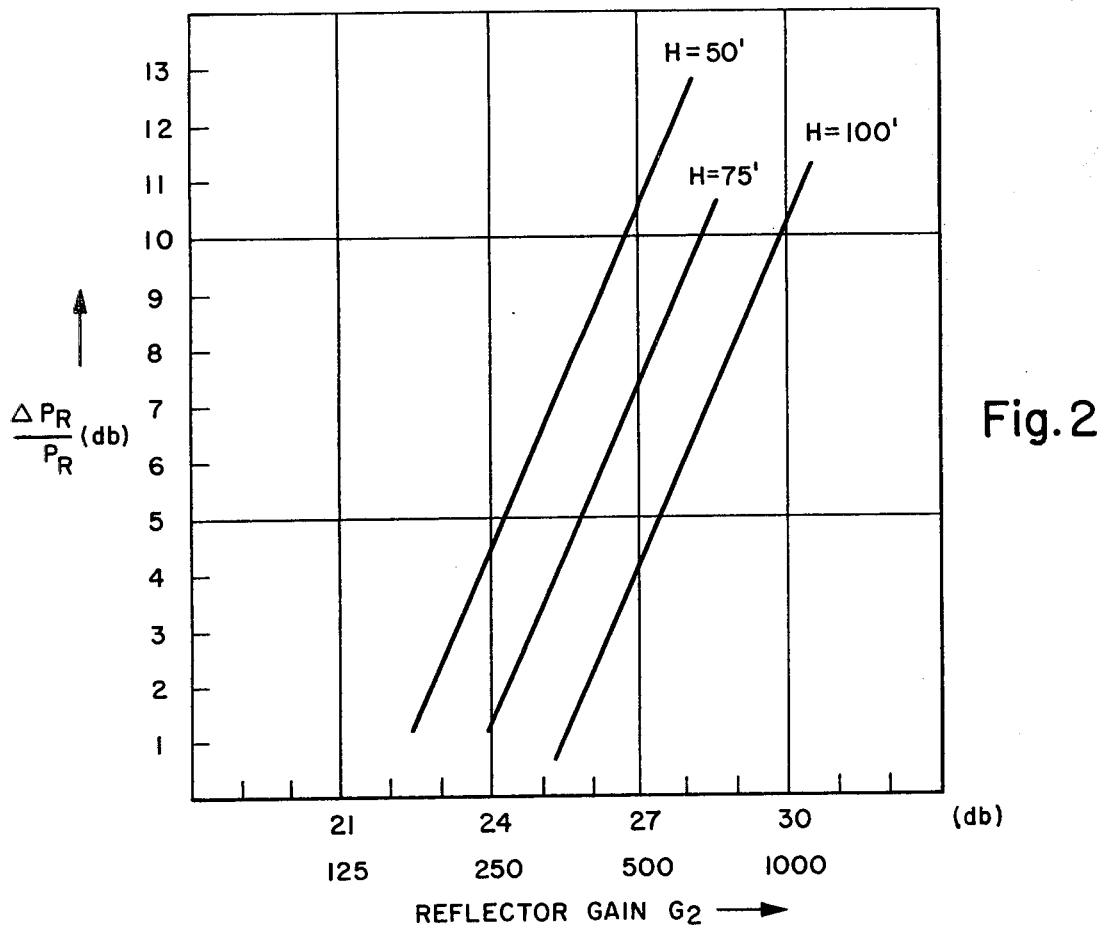
FIG. 2 is a chart of the radio altimeter return signal power v. reflector gain for distances of 50, 75 and 100 feet from the reflector.

FIG. 2 is a plot of the ratio $$\frac{\Delta P_R}{P_R}$$

against reflector gain $G_2$ for altitudes of 50, 75 and 100 feet, assuming that the altimeter antenna gain $G_1 = 10$ dB, the ground reflectivity $\sigma_1 = 0.1$ ($-10$ dB) and the reflector reflectivity $\sigma_2 = 1$ (0 dB).

The beamwidth of an antenna is given approximately by the relationship $$\theta = \frac{160}{\sqrt{G}} \quad \text{(Equation 3)}$$

where $\theta$ is the angle between the half-power points ($-3$ dB) of the beam; and G is the gain of the antenna expressed as a power ratio.

The distance from the beam axis to the beam half-power point at a particular altitude is given by the expression $$W = H \tan(\theta/2) \quad \text{(Equation 4)}$$

where

H is the altitude; and $\theta$ is the beamwidth.

Figure 3:
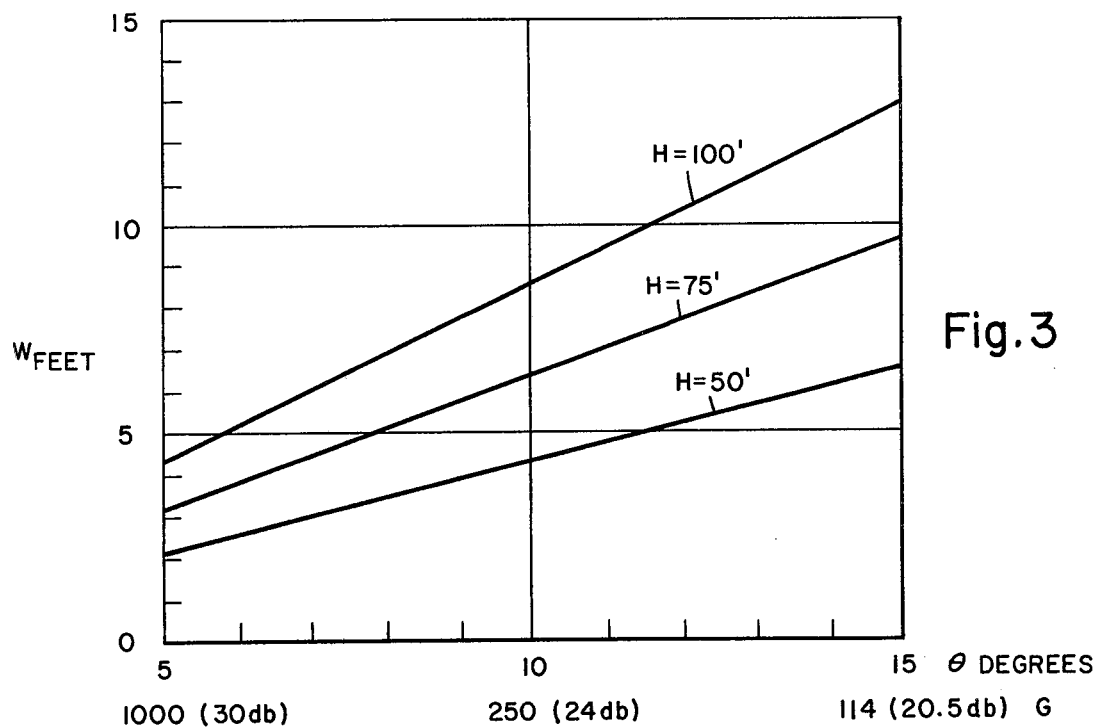
FIG. 3 is a chart of the distance from the axis of a reflector beam to the beam half-power points v. reflector beamwidth for distances of 50, 75 and 100 feet from the reflector.

FIG. 3 is a plot, obtained by combining equations 3 and 4, of beamwidths v. reflector gain for altitudes of 50, 75 and 100 feet.

Applying the geometry of the installation of FIG. 1 and assuming a reflector gain of 27 dB, FIG. 2 shows that the reflected radio altimeter signal received by an aircraft passing through point 20 of FIG. 1 will be at a level approximately 7 dB above the level of the normal return signal. The angular beamwidth of a reflector having a gain of 27 dB is approximately 7 degrees resulting in a linear half-beamwidth of approximately 4.5 feet at an altitude of 75 feet (FIG. 3). Thus passage of an aircraft through the critical point 20 within acceptable vertical and horizontal tolerances may be determined by threshold detecting the radio altimeter return signal at a level of approximately 4 dB above the normal return and, at the time of reception of a return signal exceeding that threshold, comparing the measured radio altitude with the predetermined altitude of 78 feet, plus or minus an altitude tolerance.

Figure 4:
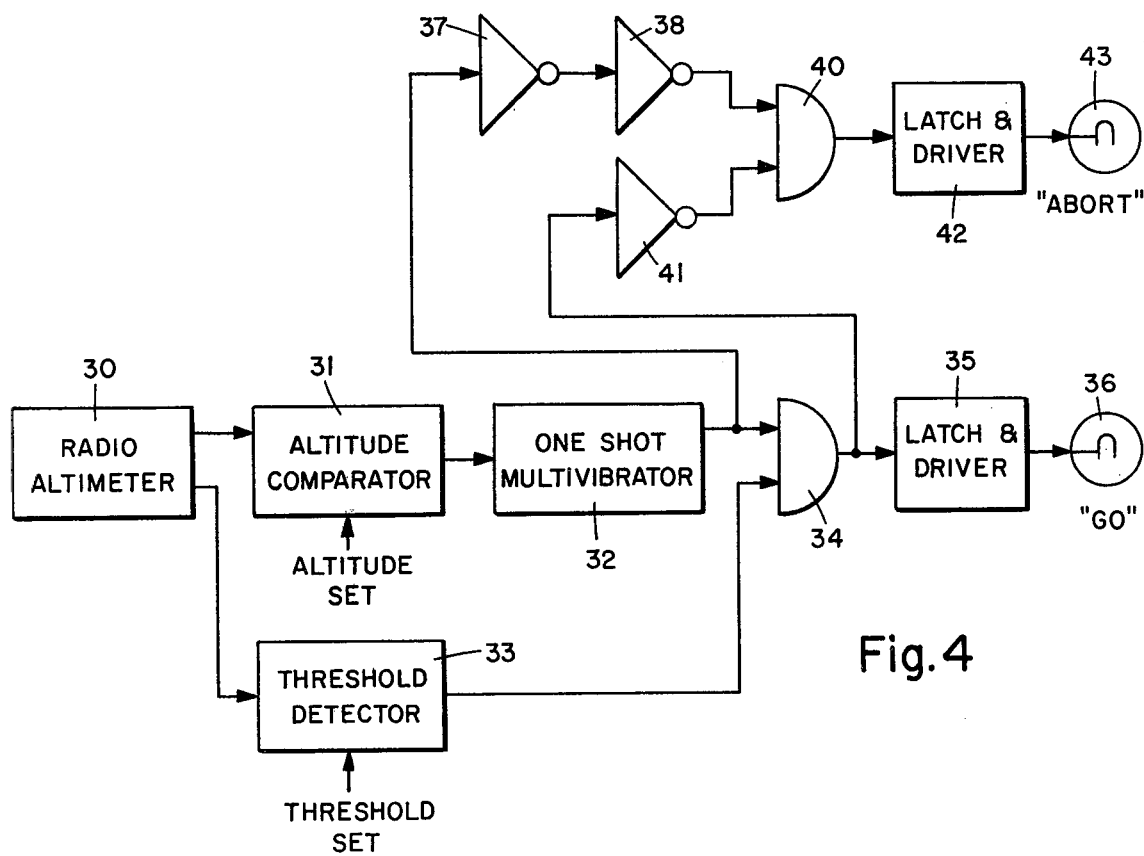
FIG. 4 is a functional block diagram of the airborne portion of the monitor of the invention.

The circuit of FIG. 4 performs such a determination and presents the results as a discrete "go" signal indicating that the landing may be safety completely or as a discrete "abort" signal indicating that a missed approach should be executed. The altitude output signal of the radio altimeter 30, which may be in analog or digital form, is applied to an altitude comparator 31. Altitude comparator 31 compares the altimeter altitude output with a constant representing the altitude of the point 20, FIG. 1, plus an allowable tolerance. Whenever the altimeter altitude signal becomes less than the constant set into the comparator, the comparator triggers a one-shot multivibrator 32 which has a period approximately equal to the time required for the aircraft, at its normal descent rate, to descend a distance equal to the allowable altitude tolerance about the point 20.

The return signal received and detected by the altimeter is applied to a threshold detector 33 which produces an output whenever the instantaneous amplitude level of the return signal exceeds the average amplitude level of the return by a predetermined threshold. The signal applied to detector 33 differs from that applied to comparator 31 in that the former is the detected return of the signal transmitted by the altimeter while the latter is the result of processing the return signal to produce a signal proportional to the time in transit of signal from the altimeter transmitter to a ground reflector and return to the altimeter receiver. The predetermined threshold at which detector 33 is set is dependent upon the gain of the reflector 10 (FIG. 1) and the allowable horizontal tolerance about the point 20. In the example given the threshold is set at a level approximately 4 dB above the average return level.

The output of detector 33 constitutes one input to an AND gate 34. The output of multivibrator 32 constitutes a second input to AND gate 34. Coincidence of both inputs to AND gate 34 causes a "true" output therefrom which actuates a latch and driver circuit 35 illuminating lamp 36, or other suitable indicator, thereby advising the pilot that the landing may be safely completed.

The output of multivibrator 32 is also applied, through inverters 37 and 38, to one input of an AND gate 40. AND gate 40 is normally enabled by the output of an inverter 41 which inverts the normally "false" output of gate 34. Inverters 37 and 38 slightly delay the application of output from multivibrator 32 to gate 40. If the inputs to gate 34 are coincident, as would occur if the aircraft flies through the "window" surrounding point 20 (FIG. 1), the "true" output of gate 34 will be inverted and reach gate 40 as an inhibiting signal before the delayed output of multivibrator 32, thereby preventing output from gate 40. If the aircraft fails to fly through the beam from reflector 10 (FIG. 1) during the "on" period of multivibrator 32 gate 40 enabled by output from inverter 41, passes the output of multivibrator 32 to trigger a latch and driver circuit 42 energizing a lamp 43, or other suitable indicator thereby warning the pilot that the aircraft is off course and that a missed approach should be executed.

Obviously the ground installation shown in FIG. 1 may be modified by positioning the reflector at a different location or the gain and beamwidth of the reflector may be different from those chosen for the example. Although the altitude set and threshold set inputs to comparator 31 and detector 33 may be made available for adjustment by the pilot, it is considered preferable to establish standardized levels for these controls and to alter the other design factors to provide the best compromise between reliability, warning time and tolerances under the range of conditions imposed by the various topographies of all the airports likely to be used by an aircraft.

A modification of the foregoing embodiment providing substantial improvement in the signal-to-noise ratio comprises equipping the reflector with doubler diodes, known in the art, which will cause the reflected signal to appear at twice the frequency of the impingent signal. Such a modification in the reflector would require a receiver operating at twice the altimeter transmitter frequency to provide signal for the threshold detector, but the invention would otherwise operate as described.

Other modifications are possible in the light of the foregoing teachings without departing from the spirit and scope of the appended claims.

I claim:

1. An aircraft landing guidance system monitor for indicating the location of the aircraft within a tolerable distance from a predetermined point on the approach path established at predetermined glide slope and azimuth angles by the guidance system, comprising, a radio altimeter aboard the aircraft including a transmitter and receiver and providing a downwardly directed radio beam for continuously measuring the altitude of the aircraft;

a beam forming reflector positioned on the ground so that the beam formed by reflection of said radio altimeter beam intersects the approach path established by said guidance system at a known altitude;

a threshold detector to which output from said radio altimeter receiver is applied and providing an output only when the amplitude of said receiver output applied thereto corresponds to the amplitude levels within said reflector beam at a tolerable distance from said intersection of said reflector beam and said approach path;

means for comparing the altitude of said aircraft with said altitude at the time of detection of said reflected energy by said threshold detector; and means for indicating the safe operation of said aircraft whenever said compared altitudes are substantially equal.

2. A monitor for a system for guiding an aircraft to a landing on an airport runway, said guiding system providing a guidance beam which is aligned with the airport runway in azimuth and which is directed upward from the runway along a fixed glide slope angle, comprising a radio altimeter aboard the aircraft for continuously measuring the altitude of the aircraft during a landing approach, said altimeter including a transmitter for transmitting a beam of radio waves toward the ground and a receiver for receiving the reflection of said beam from the ground;

a radio wave reflector on the ground and so located relative to the airport runway upon which the aircraft is to land that said altimeter transmitter beam will impinge upon said reflector when the aircraft is substantially on the course directed by said landing system, said reflector forming a reflected beam from said energy impinge thereon which intersects said guidance beam at a known altitude;

means in said aircraft and associated with said altimeter receiver for detecting said reflected beam;

means for comparing the altitude of said aircraft measured by said radio altimeter with said known altitude of intersection of said reflected beam with said guidance beam and for providing an enabling signal of limited time duration when said compared altitudes are substantially equal;

means operative for the duration of said enabling signal and actuated by said means for detecting said reflected beam for indicating that the landing may be safety completed; and means inhibited by said means for detecting said reflected beam and actuated by said enabling signal when not inhibited to provide an indication that the landing may not be safety completed.

3. A monitor as claimed in claim 2 wherein said means for detecting said reflected beam includes a threshold detector providing an output only when the amplitude of signals applied thereto exceeds a predetermined threshold level.

4. A monitor as claimed in claim 3 wherein said threshold detector provides an actuating output to said means for indicating that the landing may be safety completely only when the amplitude of signals applied thereto corresponds to the amplitude of reflections of signals from said altimeter transmitter beam produced by said reflector.

* * * * *